United States Patent
Hair et al.

(10) Patent No.: US 12,107,527 B2
(45) Date of Patent: Oct. 1, 2024

(54) METHOD AND SYSTEM FOR ACTIVE DETECTION OF ROTOR MAGNET TEMPERATURE

(71) Applicant: FORD GLOBAL TECHNOLOGIES, LLC, Dearborn, MI (US)

(72) Inventors: Jonathan Hair, Royal Oak, MI (US); Yingfeng Ji, Northville, MI (US); Matthew Penne, Hadar, NE (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 17/851,755

(22) Filed: Jun. 28, 2022

(65) Prior Publication Data
US 2023/0421090 A1  Dec. 28, 2023

(51) Int. Cl.
*H02P 6/00* (2016.01)
*B60L 15/20* (2006.01)
*H02P 6/16* (2016.01)
*H02P 23/14* (2006.01)
*H02P 29/60* (2016.01)

(52) U.S. Cl.
CPC .............. *H02P 29/67* (2016.11); *B60L 15/20* (2013.01); *H02P 23/14* (2013.01); *B60L 2240/423* (2013.01)

(58) Field of Classification Search
CPC ........... H02P 29/67; H02P 23/14; B60L 15/20
USPC .................................................. 318/400.35
See application file for complete search history.

(56) References Cited

U.S. PATENT DOCUMENTS

| | | | |
|---|---|---|---|
| 7,979,171 B2* | 7/2011 | Wu ..................... | H02P 29/662 701/32.9 |
| 9,054,630 B2 | 6/2015 | Kobayashi et al. | |
| 9,372,235 B2* | 6/2016 | Weber ................. | H02P 29/032 |
| 2007/0120519 A1* | 5/2007 | Sakamoto ............ | H02P 25/03 318/722 |
| 2010/0250163 A1* | 9/2010 | Maegawa ........... | G01R 31/3842 702/63 |
| 2012/0306422 A1* | 12/2012 | Hao ..................... | G01K 7/22 318/490 |

(Continued)

FOREIGN PATENT DOCUMENTS

JP    5776349 B2    9/2015

*Primary Examiner* — Erick D Glass
(74) *Attorney, Agent, or Firm* — David B. Kelley; Brooks Kushman P.C.

(57) ABSTRACT

A controller detects a rotor magnet temperature based on an actively detected back electromotive force (BEMF) voltage of the motor. The controller detects the BEMF voltage by commanding the injection of a direct-axis (d-axis) current into the motor while the motor is spinning but otherwise commanding no torque. The controller actively detects the BEMF voltage in that the controller purposely injects a known quantity of d-axis current at a chosen time during which the controller detects or is aware that the motor is commanding no torque. Using a quadrature-axis (q-axis) voltage equation, which describes the relationship between a voltage command, the current, the BEMF voltage, and reactance in the q-axis, the controller solves for the BEMF voltage with the voltage command, the current, and the q-axis reactance being known to the controller. The controller detects the rotor magnet temperature based on the BEMF voltage.

15 Claims, 3 Drawing Sheets

(56) References Cited

U.S. PATENT DOCUMENTS

| | | | | |
|---|---|---|---|---|
| 2013/0270974 | A1* | 10/2013 | Wang | G01R 31/58 |
| | | | | 310/68 R |
| 2016/0141999 | A1* | 5/2016 | Han | H02P 21/00 |
| | | | | 318/473 |

* cited by examiner

METHOD AND SYSTEM FOR ACTIVE DETECTION OF ROTOR MAGNET TEMPERATURE

TECHNICAL FIELD

The present disclosure relates to controlling a motor and/or other components according to a temperature of a rotor of the motor.

BACKGROUND

A permanent magnet (PM) synchronous motor includes a rotor disposed within a stator. The rotor includes one or more permanent magnets mounted therein. The rotor and the permanent magnets have a temperature ("the rotor magnet temperature"). It is desirable to know the rotor magnet temperature such as for use in controlling the motor.

SUMMARY

An object includes detecting the rotor magnet temperature of a motor, such as a traction motor of an electrified vehicle (EV), based on an actively detected back electromotive force (BEMF) voltage of the motor.

A method for use with a motor having a rotor including a permanent magnet is provided. The method includes, while detecting that a torque of the motor is zero, injecting a direct-axis current into the motor. The method further includes detecting a BEMF voltage of the motor resulting from the direct-axis current injected into the motor and detecting a rotor magnet temperature of the motor based on the BEMF voltage.

The method may further include controlling the motor according to the rotor magnet temperature.

The method may further include controlling the motor to cause the torque of the motor to be zero in order to detect the torque of the motor being zero. Controlling the motor to cause the torque of the motor to be zero may occur upon detecting that a temperature of a stator of the motor has reached a predetermined threshold. Controlling the motor to cause the torque of the motor to be zero may include controlling another motor to carry the missing torque.

Detecting for the torque of the motor to be zero may occur upon detecting that a temperature of a stator of the motor has reached a predetermined threshold.

The method may further include normalizing the BEMF voltage based on a speed of the motor to obtain a normalized BEMF voltage. In this case, the rotor magnet temperature is detected based on the normalized BEMF voltage.

The rotor magnet temperature may be further detected based on a temperature coefficient of the permanent magnet.

Detecting for the torque of the motor to be zero may occur periodically.

The BEMF voltage may be detected from an equation $V_S^* \cos \delta = E_t + (X_{ds} * I_{ds}) + (R_S * I_{qs})$, where $V_S^* \cos \delta$ is a quadrature-axis voltage command for causing the direct-axis current to be injected into the motor, $E_t$ is the BEMF voltage, $I_{ds}$ is the direct-axis current, $I_{qs}$ is a quadrature-axis current, $X_{ds}$ is a direct-axis reactance, and $R_S$ is a resistance of a stator of the motor, where the quadrature-axis current is known to be zero as the torque of the motor is zero, and where the quadrature-axis voltage command, the direct-axis current, and the direct-axis reactance are known.

A system having a motor and a controller is also provided. The motor has a rotor including a permanent magnet. The controller is configured to inject a direct-axis current into the motor upon detecting that a torque of the motor is zero and to reduce a speed of the motor according to a BEMF voltage of the motor resulting from the d-axis current.

An automotive control system for use with a fraction motor having a rotor including a permanent magnet is also provided. The automotive control system includes a controller configured to inject a direct-axis current into the traction motor upon detecting that a torque of the traction motor is zero, detect a BEMF voltage of the traction motor resulting from the direct-axis current injected into the traction motor, and detect a rotor magnet temperature of the traction motor based on the BEMF voltage.

DETAILED DESCRIPTION

Figure 1:
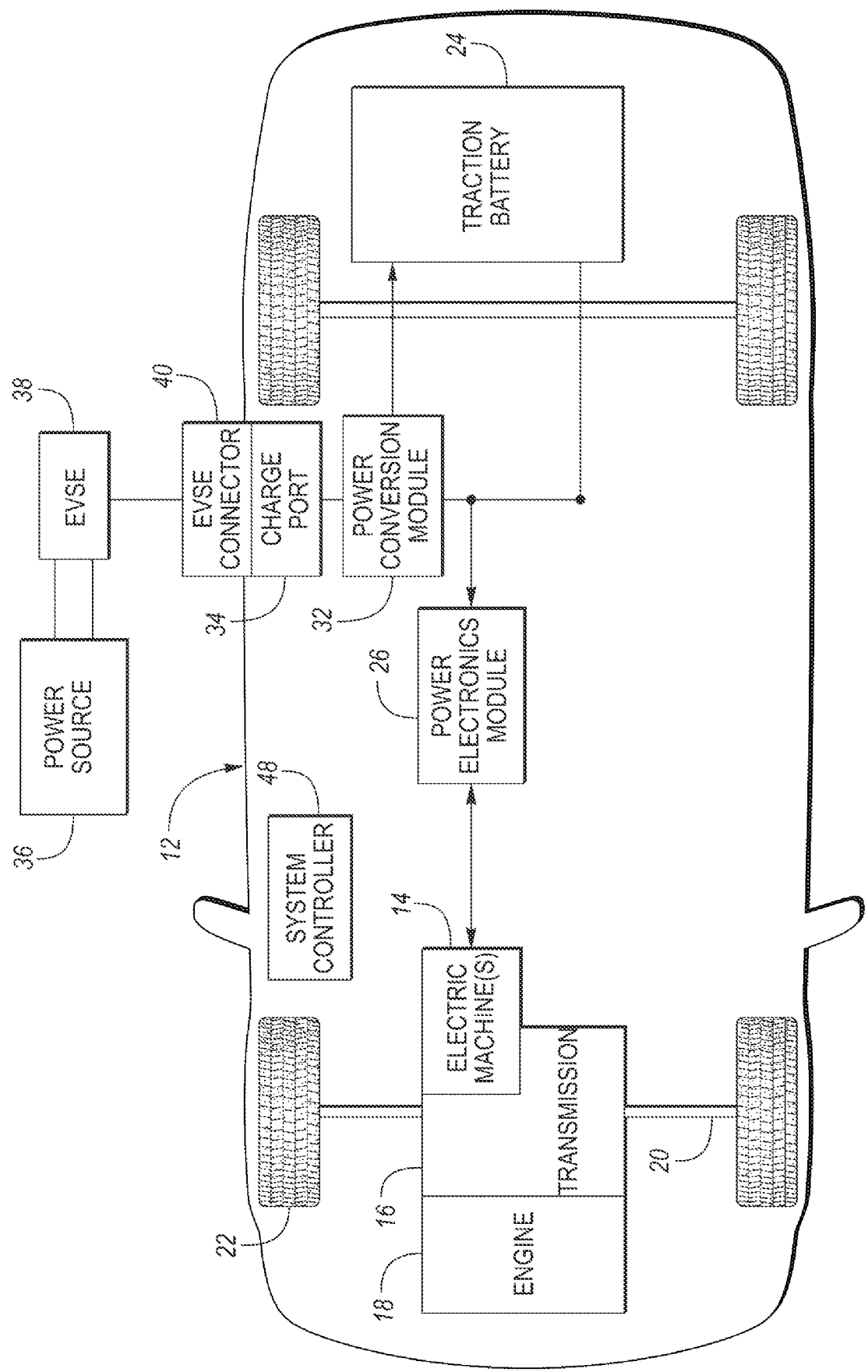
FIG. 1 illustrates a block diagram of an electrified vehicle (EV) having a traction powertrain including a traction motor, a power electronics module such as an inverter, and a traction battery.

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In a permanent magnet (PM) synchronous motor, the rotor and permanent magnets of the rotor have a temperature ("the rotor magnet temperature") which varies during usage of the motor. The rotor magnet temperature is a factor that can be considered in controlling the operation of the motor. As such, a controller for controlling the motor should have an accurate means to measure or estimate the rotor magnet temperature. Accurate rotor magnet temperature measurement is useful for proper motor torque accuracy, motor loss estimation, and protection against demagnetization of the permanent magnets. Demagnetization of the permanent magnets is a concern for high-performance motors operating at high temperatures and field weakening zone.

Embodiments of the present disclosure provide methods and systems for detecting the rotor magnet temperature. The methods and systems detect the rotor magnet temperature based on an actively detected permanent magnetic flux of the motor. The permanent magnetic flux of the motor corresponds to a back electromotive force (BEMF) voltage of the motor. As described herein, in embodiments of the present disclosure, the BEMF voltage is used as a measure for estimating the permanent magnetic flux. The rotor magnet temperature detection may thus entail detecting the BEMF voltage, estimating the permanent magnetic flux of the motor based on the detected BEMF voltage, and estimating the rotor magnet temperature based on the estimated permanent magnetic flux.

Embodiments of the present disclosure provide a controller which carries out operations of the methods and systems. In operation, the controller detects the BEMF voltage of the motor by commanding the injection of a direct-axis (d-axis) electrical current to the motor while the motor is spinning but otherwise commanding no torque. The controller actively detects the BEMF voltage in that the controller purposely injects a known quantity of d-axis current at a chosen time during which the controller detects or is aware that the motor is commanding no torque. Using the standard quadrature-axis (q-axis) voltage equation (which describes the relationship between a voltage command, the current, the BEMF voltage, and reactance in the quadrature-axis (q-axis)), the controller solves for the BEMF voltage as the voltage command, the current, and the q-axis reactance are quantities known to the controller. The rotor magnet temperature corresponds to the BEMF voltage. Consequently, the controller can detect the rotor magnet temperature based on the BEMF voltage. In this way, the controller actively detects the rotor magnet temperature. In turn, the controller may control the motor and/or other components as a function of the rotor magnet temperature, taken alone or in conjunction with other inputs.

The current in the standard q-axis voltage equation is comprised of the d-axis current and a q-axis current. Both of the d-axis current and the q-axis current are known to the controller. When the motor is commanding no torque, the q-axis current is equal to zero. The d-axis current injected to the motor does not cause the motor to command torque. As such, the q-axis current drops out of the standard q-axis voltage equation when the controller solves for the BEMF voltage in actively detecting the BEMF voltage.

As will now be described in detail, in certain embodiments of the present disclosure, the controller is a vehicle controller of an electrified vehicle (EV), and the motor is a traction motor of the EV whereby the vehicle controller carries out the operations to detect the rotor magnet temperature of the traction motor.

Referring now to FIG. 1, a block diagram of an exemplary EV 12 is shown. EV 12 includes a traction powertrain including and one or two or more traction motors ("electric machine(s)") 14, a traction battery (or "battery pack") 24, and a power electronics module 26 such as an inverter. In this example, EV 12 is a hybrid electric vehicle (HEV) further having an engine 18. In other examples, EV 12 is battery-only electric vehicle (BEV). In a BEV configuration, EV 12 does not include engine 18.

Traction motor 14 is part of the traction powertrain of EV 12 for powering movement of the EV (i.e., traction motor 14 is operable to provide propulsion capability to EV 12). In this regard, traction motor 14 is mechanically connected to a transmission 16 of EV 12. Transmission 16 is mechanically connected to a drive shaft 20 that is mechanically connected to wheels 22 of EV 12. Engine 18 is also mechanically connected to transmission 16 to provide propulsion capability to EV 12.

Traction motor 14 can provide propulsion capability to EV 12 while engine 18 is turned on or off. Traction motor 14 is also capable of operating as a generator. Traction motor 14 acting as a generator can recover energy that may normally be lost as heat in a friction braking system of EV 12.

Traction battery 24 stores electrical energy that can be used by traction motor 14 for propelling EV 12. Traction battery 24 typically provides a high-voltage (HV) direct current (DC) output. Traction battery 24 is electrically connected to inverter (or "power electronics module") 26. Traction motor 14 is also electrically connected to inverter 26. Inverter 26 provides the ability to bi-directionally transfer energy between traction battery 24 and traction motor 14. For example, traction battery 24 may provide a DC voltage while traction motor 14 may require a three-phase alternating current (AC) current to function. Inverter 26 may convert the DC voltage to a three-phase AC current to operate traction motor 14. In a regenerative mode, inverter 26 may convert three-phase AC current from traction motor 14 acting as a generator to DC voltage compatible with traction battery 24.

In this example, EV 12 is a plug-in HEV (PHEV). As such, traction battery 24 is rechargeable by an external power source 36 (e.g., the grid). External power source 36 may be electrically connected to electric vehicle supply equipment (EVSE) 38. EVSE 38 provides circuitry and controls to control and manage the transfer of electrical energy between external power source 36 and EV 12. External power source 36 may provide DC or AC electric power to EVSE 38. EVSE 38 may have a charge connector 40 for plugging into a charge port 34 of EV 12.

A power conversion module 32 of EV 12 may condition power supplied from EVSE 38 to provide the proper voltage and current levels to traction battery 24. Power conversion module 32 may interface with EVSE 38 to coordinate the delivery of power to traction battery 24. Alternatively, various components described as being electrically connected may transfer power using a wireless inductive coupling.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating EV 12. In embodiments, controller 48 is a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Figure 2:
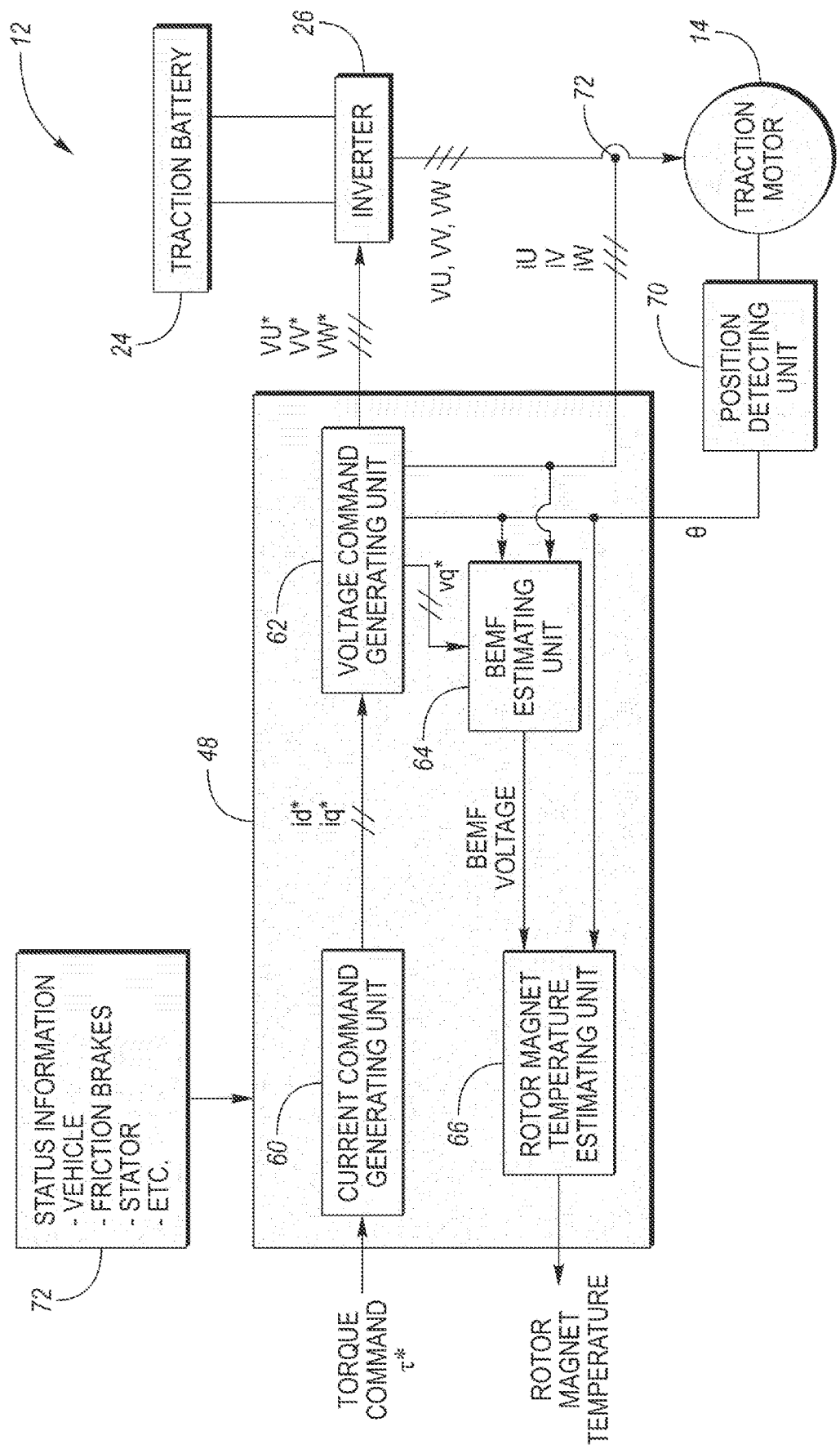
FIG. 2 illustrates a functional diagram of a controller in operative arrangement with the traction motor, the inverter, and the traction battery for actively detecting a back electromotive force (BEMF) voltage of the traction motor to detect therefrom a rotor magnet temperature of the traction motor.

Referring now to FIG. 2, with continual reference to FIG. 1, a functional diagram of controller 48 in operative arrangement with traction motor 14, inverter 26, and traction battery 24 for actively detecting the BEMF voltage of the traction motor to detect therefrom a rotor magnet temperature of the traction motor is shown. The operative arrangement shown in FIG. 2 presumes that traction motor 14 is a three-phase traction motor.

In ordinary operation, controller 48 controls inverter 26 to power traction motor 14 with electrical energy from traction battery 24 for the traction motor to propel the EV. In this regard, controller 48 is supplied with a torque command $\tau^*$ from a vehicle system. The vehicle system, which may or may not be a part of controller 48, generates a torque command τ* depending on various vehicle-related inputs such as a driver input to a drive or brake pedal or a vehicle speed. In turn, controller 48 controls inverter 26 according to the torque command τ* for traction motor 14 to generate a torque output commensurate with the torque command τ*. The torque output is used to propel the EV.

More particularly, controller 48 includes a current command generating unit 60 which receives the torque command τ* and selects or determines a q-axis current command iq* and a d-axis current command id* corresponding to the torque command τ*. Controller 48 further includes a voltage command generating unit 62 which generates a q-axis voltage command vq* and a d-axis voltage command vd* so as to match q-axis current iq and d-axis current id with the respective current commands iq* and id*, transforms the voltage commands vq* and vd* into three-phase AC voltage commands vu*, vv*, and vw*, and outputs the voltage commands vu*, vv*, and vw* to inverter 26. Inverter 26 applies the voltages vu, vv, and vw to traction motor 14 on the basis of the voltage commands vu*, vv*, and vw* using a pulse-width-modulated (PWM) control method or the like whereby the traction motor is controlled to generate a torque output commensurate with the torque command τ*.

Controller 48 further includes a position detector 70 that detects a rotational position θ and a rotational speed $\omega_r$ of the rotor of traction motor 14. The rotor position θ means an angle in a N-pole direction of a permanent magnet about an axis based on a u-phase armature winding. In general, a d-axis of a rotary orthogonal two-axis (d-q axes) coordinate system rotating at a rotational velocity (referred to as an electrical angular frequency ω) of traction motor 14 is defined in the N-pole direction of the permanent magnet and a q-axis is defined in a direction perpendicular to the d-axis and leading the d-axis by 90°. Controller 48 further includes a current detector 72 that detects armature current iu, iv, and iw of traction motor 14. The q-axis current iq and the d-axis current id are obtained from a transformation of the armature current iu, iv, and iw.

In accordance with the present disclosure, as set forth above, controller 48 is further configured to detect the rotor magnet temperature of traction motor 14 based on a BEMF traction motor voltage actively detected by the controller. In this regard, controller 48 further includes a BEMF estimating unit 64 and a rotor magnet temperature estimating unit 66.

In operation, controller 48 commands the injection of a d-axis current id to traction motor 14 while the traction motor is spinning but otherwise commanding no torque in order to actively detect the BEMF voltage of the traction motor. Particularly, at a selected time during which traction motor 14 is commanding no torque, current command generating unit 60 generates a d-axis current command id* corresponding to a selected quantity of d-axis current id to be injected to traction motor 14. Voltage command generating unit 62 generates a d-axis voltage command vd* so as to match the d-axis current id with the current command id*, transforms the voltage command vd* into three-phase AC voltage commands vu*, vv*, and vw*, and outputs the voltage commands vu*, vv*, and vw* to inverter 26. Inverter 26 applies the voltages vu, vv, and vw to traction motor 14 on the basis of the voltage commands vu*, vv*, and vw* whereby the selected d-axis current id is injected to traction motor 14. In response to d-axis current id being injected to traction motor, a BEMF voltage of the traction motor is generated.

Figure 3:
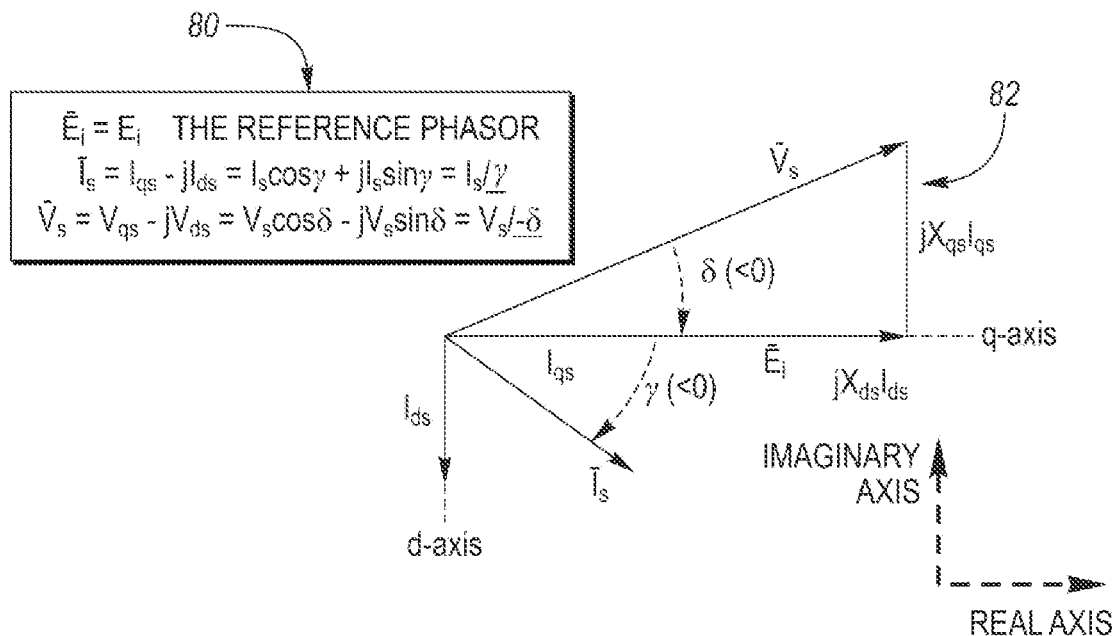
FIG. 3 illustrates a set of voltage and current equations and a corresponding phasor diagram associated with the traction motor.

Turning briefly to FIG. 3, with continual reference to FIG. 2, a set of voltage and current equations 80 and a corresponding phasor diagram 82 associated with traction motor 14 are shown. Equations 80 and phasor diagram 82 are known to those of skill in the art. From equations 80 and phasor diagram 82, the standard q-axis voltage equation and the standard d-axis voltage equation are as follows:

$$q\text{-axis } V_S^* \cos \delta = E_f + (X_{ds} * I_{ds}) + (R_S * I_{qs}) \tag{1}$$

$$d\text{-axis } V_S^* \sin \delta = (R_S * I_{ds}) - (X_{qs} * I_{qs}) \tag{2}$$

In the q-axis voltage equation (1), $V_S^* \cos \delta$ is the q-axis voltage command, $E_f$ is the BEMF voltage, Id s is the d-axis current id, $I_{qs}$ is the q-axis current iq, $X_{ds}$ is the d-axis reactance, and $R_S$ is the stator resistance. Further, in the d-axis voltage equation (2), $V_S^* \sin \delta$ is the d-axis voltage command and $X_{qs}$ is the q-axis reactance.

Controller 48 uses the q-axis voltage equation (1) in actively detecting the BEMF voltage of traction motor 14 as the BEMF voltage ($E_f$) is a component of the q-axis voltage equation. Conversely, the BEMF voltage ($E_f$) is not a component of the d-axis voltage equation (2) and therefore the d-axis voltage equation (2) is not used in actively detecting the BEMF voltage.

Further, when the torque of traction motor 14 is zero, the q-axis current iq is zero (i.e., $I_{qs}=0$). Accordingly, the term $R_S * I_{qs}$ is also equal to zero and therefore drops out of the q-axis voltage equation (1). The q-axis voltage equation thus simplifies as follows:

$$q\text{-axis with no motor torque } V_S^* \cos \delta = +(X_{ds} * I_{ds}) \tag{3}$$

As indicated, controller 48 operates to cause a selected d-axis current id to be injected to traction motor 14. Thus, the d-axis current $I_{ds}$, which is the injected d-axis current id, is known to controller 48. In order to cause the selected d-axis current id to be injected to traction motor 14, controller 48 generates the corresponding q-axis voltage command $V_S^* \cos \delta$. Thus, the q-axis voltage command $V_S^* \cos \delta$ is also known to controller 48. The reactance $X_{ds}$, which corresponds to the value of the d-axis current $I_{ds}$, is known through a look-up table by controller 48. Further, the injection of the d-axis current id does not modify the torque of traction motor 14 and the q-axis current thus remains at zero.

Controller 48 (or more particularly, BEMF estimating unit 64 of the controller) solves for the BEMF voltage $E_f$ in the simplified q-axis voltage equation (3) with the other terms in this equation being known to the controller. In sum, when some d-axis current id is injected, the q-axis voltage command will be known to controller 48 and the controller can solve the q-axis voltage equation for the BEMF voltage.

Controller 48 (or more particularly, rotor magnet temperature estimating unit 66 of the controller) receives the detected BEMF voltage from BEMF estimating unit 64. The rotor magnet temperature corresponds to the BEMF voltage. Controller 48 detects the rotor magnet temperature based on the BEMF voltage. The rotor magnet temperature, as well as the BEMF voltage, may be used by controller 48 (and/or other controllers) in controlling traction motor 14 and/or other components.

In this way, controller 48 detects the rotor magnet temperature of traction motor 14 based on an actively detected BEMF voltage of the traction motor. Controller 48 actively detects the BEMF voltage in that the controller purposely injects a known quantity of d-axis current id at a chosen time during which traction motor 14 is commanding no torque and then uses the standard q-axis voltage equation in order to detect therefrom the resultant BEMF voltage.

As indicated, controller 48 detects or is aware when traction motor 14 is spinning but otherwise commanding no torque. In this regard, controller 48 receives status information 72 indicative of various conditions/statuses pertaining to whether traction motor 14 is commanding torque. For instance, traction motor 14 commands no torque when EV 12 is coasting or when the EV is braking with its friction brakes, when the EV is using a secondary drive instead of the traction motor, etc. As such, during any of these conditions, controller 48 detects or is aware that traction motor 14 is commanding no torque. In turn, controller 48 may perform the rotor magnet temperature active detection process during these times.

Other conditions may be considered by controller 48 in deciding when to perform the rotor magnet temperature active detection process. For instance, controller 48 may seek to perform the rotor magnet temperature active detection process upon the temperature of the stator of traction motor 14 reaching a predetermined threshold. (Unlike the rotor magnet temperature, the stator temperature is reasonably accessible by a thermistor.)

Further, as described above, EV 12 may include two or more traction motors 14. Thus, in this case, controller 48 may control a first traction motor to carry zero torque and control a second traction motor to carry the torque missing from the first traction motor and the controller may perform the rotor magnet temperature active detection process on the first traction motor while the first traction motor is carrying no torque. Likewise, at a subsequent time, controller 48 may control the second traction motor to carry zero torque and control the first traction motor to carry the torque missing from the second traction motor and the controller may perform the rotor magnet temperature active detection process on the second traction motor while the second traction motor is carrying no torque.

In accordance with embodiments of the present disclosure, the rotor magnet temperature active detection process entails the following operations. In use, controller 48 periodically, when appropriate, causes d-axis current momentarily. Controller 48 solves for the resulting BEMF voltage and normalizes the BEMF voltage for the speed of traction motor 14. Using known magnet temperature coefficients, or an empirically developed look-up table, controller 48 estimates the rotor magnet temperature from the normalized BEMF voltage. When the vehicle is a dual motor vehicle, controller 48 can cause the torque of a first traction motor (e.g., primary drive unit) to be transferred to a second traction motor (e.g., a secondary drive unit), to facilitate a rotor magnet temperature check of the first traction motor. A rotor magnet temperature check could happen at regular intervals, or when the stator temperature exceeds some threshold to warrant concern of the rotor.

As an example, suppose that while a vehicle is driving, the stator thermistor indicates that the motor temperature is getting hot. There are many instances during the course of driving in which the motor torque may be momentarily zero or in which the vehicle is braking with the friction brakes of the vehicle. During any of these instances, the controller may command a d-axis current (e.g., 50 A) to be injected into the motor. No motor torque will be produced as a result of the injected d-axis current, and the rotor magnet temperature can be estimated as described. This assists in enabling the vehicle to operate at peak performance as long as possible.

As indicated, the rotor magnet temperature is detected based on the BEMF voltage as the rotor magnet temperature corresponds to the BEMF voltage. This rotor magnet temperature calculation from the detected BEMF voltage will now be described in greater detail. The BEMF voltage at a given temperature and mechanical motor speed is known for a given motor. For instance, the BEMF voltage at a temperature of 20° C. and 1000 rpm for traction motor 14 is known. The temperature coefficient α is also known for the permanent magnets in traction motor 14. The rotor magnet temperature of traction motor 14 can be solved with the following equation:

$$((BEMF_{meas} * (RPM_{ref}/RPM_{meas})) - BEMF_{ref})/\alpha) - temp_{ref} = temp_{rotor} \quad (4)$$

As set forth, a reference BEMF voltage at a given speed/temperature is known. The measured BEMF voltage is normalized for motor speed and then compared to the known BEMF voltage to determine the rotor magnet temperature. Alternatively, an empirically developed look-up table can be used.

Figure 4:
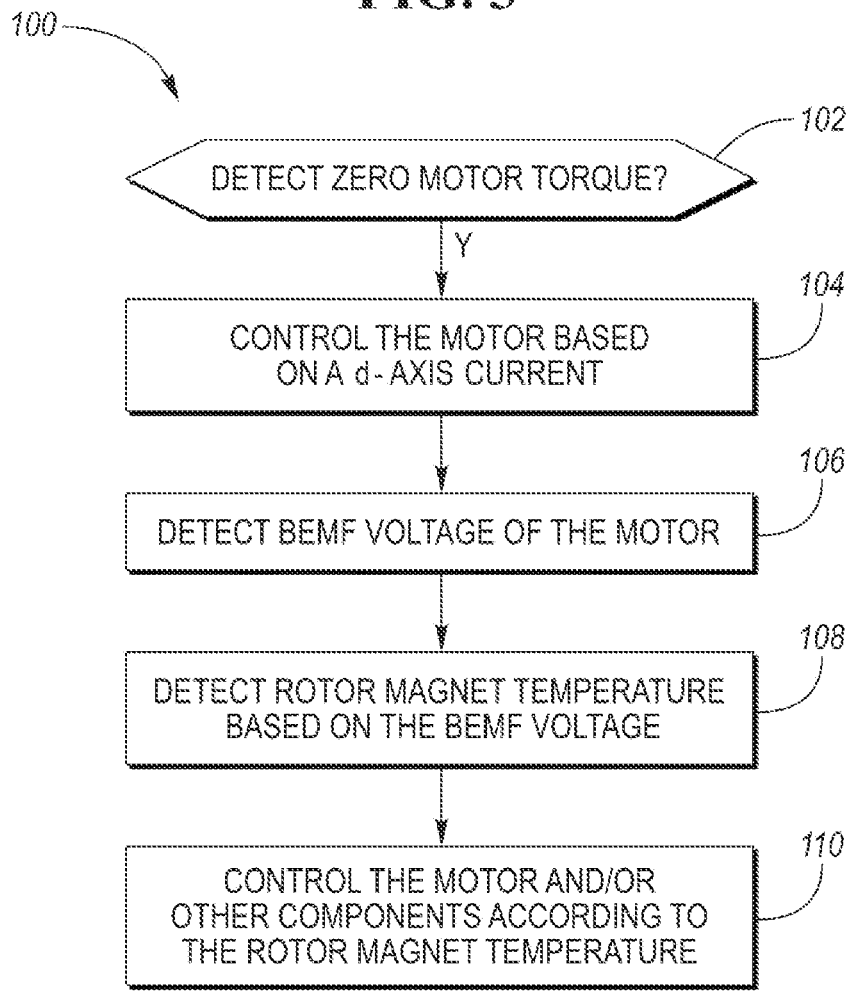
FIG. 4 illustrates a flowchart depicting operation carried out by the controller for actively detecting the BEMF voltage of the traction motor to detect therefrom the rotor magnet temperature of the traction motor in order to control the traction motor and/or other components as a function of the rotor magnet temperature.

Referring now to FIG. 4, a flowchart 100 depicting operation carried out by controller 48 for actively detecting the BEMF voltage of traction motor 14 to detect therefrom the rotor magnet temperature of the traction motor in order to control the traction motor and/or other components as a function of the rotor magnet temperature is shown.

The operation begins with controller 48 detecting whether traction motor 14 is spinning, but otherwise commanding no torque, as indicated in decision block 102. As described, controller 48 may use status information 72 to detect or be made aware of when traction motor 14 is commanding no torque. As further described, controller 48 is further operable to purposely control traction motor 14 to carry no torque.

While traction motor 14 is carrying no torque, the operation continues with controller 48 commanding a d-axis current injection to traction motor 14, as indicated in process block 104. Consequently, traction motor 14 is controlled based on the injected d-axis current and generates a BEMF voltage. Controller 48 detects the BEMF voltage using the standard q-axis voltage equation, as indicated in process block 106. As described, the BEMF voltage is normalized based on angular speed of the traction motor. Controller 48 detects the rotor magnet temperature based on the (normalized) BEMF voltage, as indicated in process block 108. As described, the temperature coefficient of the rotor magnet is used in detecting the rotor magnet temperature based on the BEMF voltage.

Controller 48 may control traction motor 14 and/or other components according to the rotor magnet temperature, as indicated in process block 110. This control step may include one or more actions that are directed or affected by rotor magnet temperature. For example, controlling the traction motor may include offloading some or all of the torque load of the traction motor to other drive units.

Advantages of the rotor magnet temperature active detection process in accordance with the present disclosure may include the following. Circumvention of overly conservative temperature limits which result from not being able to physically measure the rotor temperature accurately. Circumvention of derating of the traction motor which results from high temperatures. Accurate rotor magnet temperature information increases accuracy of motor torque and losses and can assist in preventing demagnetization. Unlike other BEMF active estimation processes, no high frequency injection which can limit control compensation methods like dithering the PWM frequency is involved. Accurate rotor magnet temperature information can enable the vehicle to operate at a maximum power for relatively longer.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the present disclosure.

What is claimed is:

1. A method for use with a motor having a rotor including a permanent magnet, comprising:
    while detecting that a torque of the motor is zero, injecting a direct-axis current into the motor;
    detecting a back electromotive force (BEMF) voltage of the motor resulting from the direct-axis current injected into the motor;
    detecting a rotor magnet temperature of the motor based on the BEMF voltage; and
    upon detecting that a temperature of a stator of the motor has reached a predetermined threshold, controlling the motor to cause the torque of the motor to be zero in order to detect the torque of the motor being zero.

2. The method of claim 1 further comprising:
    controlling the motor according to the rotor magnet temperature.

3. The method of claim 1 wherein:
    the motor is a first motor; and
    controlling the first motor to cause the torque of the first motor to be zero includes controlling a second motor to carry torque missing from the first motor.

4. The method of claim 1 further comprising:
    normalizing the BEMF voltage based on a speed of the motor to obtain a normalized BEMF voltage; and
    wherein the rotor magnet temperature is detected based on the normalized BEMF voltage.

5. The method of claim 1 wherein:
    the rotor magnet temperature is further detected based on a temperature coefficient of the permanent magnet.

6. The method of claim 1 wherein:
    detecting for the torque of the motor to be zero occurs periodically.

7. The method of claim 1 wherein:
    the BEMF voltage is detected from an equation $V_S * \cos \delta = E_t + (X_{ds} * I_{ds}) + (R_S * I_{qs})$, where $V_S * \cos \delta$ is a quadrature-axis voltage command for causing the direct-axis current to be injected into the motor, $E_t$ is the BEMF voltage, $I_{ds}$ is the direct-axis current, $I_{qs}$ is a quadrature-axis current, $X_{ds}$ is a direct-axis reactance, and $R_S$ is a resistance of a stator of the motor, where the quadrature-axis current is known to be zero as the torque of the motor is zero, and where the quadrature-axis voltage command, the direct-axis current, and the direct-axis reactance are known.

8. A system comprising:
    a motor having a rotor including a permanent magnet; and
    a controller configured to inject a direct-axis current into the motor upon detecting that a torque of the motor is zero and to reduce a speed of the motor according to a back electromotive force (BEMF) voltage of the motor resulting from the d-axis current, the controller is further configured to detect for the torque of the motor being zero upon a temperature of a stator of the motor reaching a predetermined threshold.

9. The system of claim 8 wherein:
    the controller is further configured to configured to detect the BEMF voltage of the motor resulting from the direct-axis current injected into the motor.

10. The system of claim 8 wherein:
    the controller is further configured to periodically detect for the torque of the motor being zero.

11. The system of claim 8 wherein:
    the motor is a first motor;
    the system further comprising a second motor; and
    wherein the controller is further configured to control the first motor to cause the torque of the first motor to be zero in order to detect for the torque of the first motor being zero and to control the second motor to carry torque missing from the first motor.

12. An automotive control system for use with a first traction motor having a rotor including a permanent magnet, the automotive control system comprising:
    a controller configured to inject a direct-axis current into the first traction motor upon detecting that a torque of the first traction motor is zero, detect a back electromotive force (BEMF) voltage of the first traction motor resulting from the direct-axis current injected into the first traction motor, and detect a rotor magnet temperature of the first traction motor based on the BEMF voltage;
    the automotive control system further comprising a second traction motor; and
    wherein the controller is further configured to control the first traction motor to cause the torque of the first traction motor to be zero in order to detect for the torque of the first traction motor being zero and the controller is further configured to control the second traction motor to carry torque missing from the first traction motor.

13. The automotive control system of claim 12 wherein:
    the controller is further configured to control the traction motor according to the rotor magnet temperature.

14. The automotive control system of claim 12 wherein:
    the controller is further configured to periodically detect for the torque of the traction motor being zero.

15. The automotive control system of claim 12 wherein:
    the controller is further configured to detect for the torque of the traction motor being zero upon a temperature of a stator of the traction motor reaching a predetermined threshold.

* * * * *